United States Patent
Peterson et al.

(10) Patent No.: US 6,612,175 B1
(45) Date of Patent: Sep. 2, 2003

(54) SENSOR USABLE IN ULTRA PURE AND HIGHLY CORROSIVE ENVIRONMENTS

(75) Inventors: Tom Peterson, Chanhassen, MN (US); Jorge Andrés Diaz Diaz, St. Paul, MN (US); Gerald R. Cucci, Minneapolis, MN (US)

(73) Assignee: NT International, Inc., Minneapolis, MN (US)

( * ) Notice: Subject to any disclaimer, the term of this patent is extended or adjusted under 35 U.S.C. 154(b) by 0 days.

(21) Appl. No.: 09/620,007

(22) Filed: Jul. 20, 2000

(51) Int. Cl.[7] .............................................. G01L 19/04
(52) U.S. Cl. ............................. 73/708; 73/715; 73/719; 73/720
(58) Field of Search .................... 73/708, 579, 720, 73/715, 723, 725, 721, 718, 514.32, 514.36, 514.16, 724; 374/118; 361/283.1, 283.4

(56) References Cited

U.S. PATENT DOCUMENTS

| | | | |
|---|---|---|---|
| 3,916,365 A | 10/1975 | Giachino | 338/2 |
| 3,930,823 A | 1/1976 | Kurtz et al. | 65/33 |
| 3,946,615 A | 3/1976 | Hluchan | 73/398 R |
| 4,016,644 A | 4/1977 | Kurtz | 29/583 |
| 4,065,970 A | 1/1978 | Wilner | 73/727 R |
| 4,127,840 A | 11/1978 | House | 338/4 |
| 4,151,578 A | 4/1979 | Bell | |
| 4,161,887 A | 7/1979 | Stone et al. | 73/720 |
| 4,177,496 A | 12/1979 | Bell et al. | 361/283 |
| 4,202,217 A | 5/1980 | Kurtz et al. | 73/727 |
| 4,203,327 A | 5/1980 | Singh | 73/721 |
| 4,207,604 A | 6/1980 | Bell | |
| 4,227,419 A | 10/1980 | Park | |
| 4,236,137 A | 11/1980 | Kurtz et al. | 388/4 |
| 4,291,293 A * | 9/1981 | Yamada et al. | 338/4 |
| 4,329,732 A | 5/1982 | Kavli et al. | |
| 4,345,476 A | 8/1982 | Singh | 73/720 |
| 4,347,745 A | 9/1982 | Singh | 73/721 |
| 4,373,399 A | 2/1983 | Beloglazov et al. | 73/777 |
| 4,395,915 A | 8/1983 | Singh | 73/720 |
| 4,398,426 A | 8/1983 | Park et al. | |
| 4,425,799 A | 1/1984 | Park | |
| 4,426,673 A | 1/1984 | Bell et al. | |
| 4,439,752 A | 3/1984 | Starr | 388/2 |
| 4,535,283 A | 8/1985 | Rabinovich et al. | 323/365 |
| 4,574,640 A | 3/1986 | Krechmery | 73/721 |
| 4,586,109 A | 4/1986 | Peters et al. | 361/283 |
| 4,600,912 A | 7/1986 | Marks et al. | 388/42 |
| 4,656,454 A | 4/1987 | Rosenberger | 338/2 |
| 4,665,754 A | 5/1987 | Glenn et al. | 73/727 |
| 4,725,406 A | 2/1988 | Compton et al. | 357/26 |
| 4,735,917 A | 4/1988 | Flatley et al. | 437/59 |
| 4,751,554 A | 6/1988 | Schnable et al. | 357/4 |
| 4,765,188 A | 8/1988 | Krechmery et al. | 73/708 |
| 4,774,843 A | 10/1988 | Ghiselin et al. | 73/727 |
| 4,864,463 A | 9/1989 | Shkedi et al. | 361/283 |
| 4,876,892 A | 10/1989 | Arabia et al. | 73/718 |
| 4,987,782 A | 1/1991 | Shkedi et al. | 73/718 |

(List continued on next page.)

Primary Examiner—Edward Lefkowitz
Assistant Examiner—Jermaine Jenkins
(74) Attorney, Agent, or Firm—Patterson, Thuente, Skaar & Christensen, P.A.

(57) ABSTRACT

A sensor operable at temperatures in excess of 400° C. is described. The sensor of the present invention operates without fluid fill, is non-porous, non-contaminating, and has no exterior exposed metallic components. The sensor includes a non-porous, impermeable sensing diaphragm that may be positioned in direct contact with fluids in an ultra-pure environment. The non-porous surface may be comprised of a layer of single crystal sapphire that is glassed to a backing plate. The sensor of the present invention is suitable for use in a chemically inert pressure transducer module for sensing pressures and/or temperatures in process fluids and may be molded directly into the high temperature plastic housing of the pressure transducer module.

150 Claims, 4 Drawing Sheets

U.S. PATENT DOCUMENTS

| | | |
|---|---|---|
| 4,994,781 A | 2/1991 | Sahagen ................... 338/47 |
| 4,999,735 A | 3/1991 | Wilner ................... 361/283 |
| 5,005,421 A | 4/1991 | Hegner et al. ............... 73/72 |
| 5,024,097 A | 6/1991 | Graeger et al. ............. 73/727 |
| 5,050,034 A | 9/1991 | Hegner et al. |
| 5,050,035 A | 9/1991 | Hegner et al. |
| 5,076,147 A | 12/1991 | Hegner et al. |
| 5,079,953 A | 1/1992 | Martin et al. |
| 5,088,329 A | 2/1992 | Sahagen ................... 73/727 |
| 5,097,712 A | 3/1992 | Gerst et al. |
| 5,111,698 A | 5/1992 | Banholzer et al. |
| 5,155,061 A | 10/1992 | O'Connor et al. ............ 437/86 |
| 5,174,926 A | 12/1992 | Sahagen ................... 252/521 |
| 5,233,875 A | 8/1993 | Obermeier et al. |
| 5,303,594 A | 4/1994 | Kurtz et al. ................ 73/727 |
| 5,315,877 A | 5/1994 | Park et al. |
| 5,334,344 A | 8/1994 | Hegner et al. .............. 420/422 |
| 5,349,492 A | 9/1994 | Kimura et al. ............ 361/283.4 |
| 5,441,591 A | 8/1995 | Imthurn et al. ............. 156/153 |
| 5,731,522 A | 3/1998 | Sittler ..................... 73/708 |
| 5,750,899 A | 5/1998 | Hegner et al. ............... 73/756 |
| 5,772,322 A | 6/1998 | Burns et al. ................ 374/118 |
| 5,808,205 A | 9/1998 | Romo ...................... 73/718 |
| 5,954,900 A | 9/1999 | Hegner et al. ............. 156/89.11 |
| 5,955,678 A | 9/1999 | Chapman et al. ............ 73/756 |
| 6,012,336 A * | 1/2000 | Eaton et al. ................ 73/720 |
| 6,031,944 A | 2/2000 | Youngner .................. 385/12 |

* cited by examiner

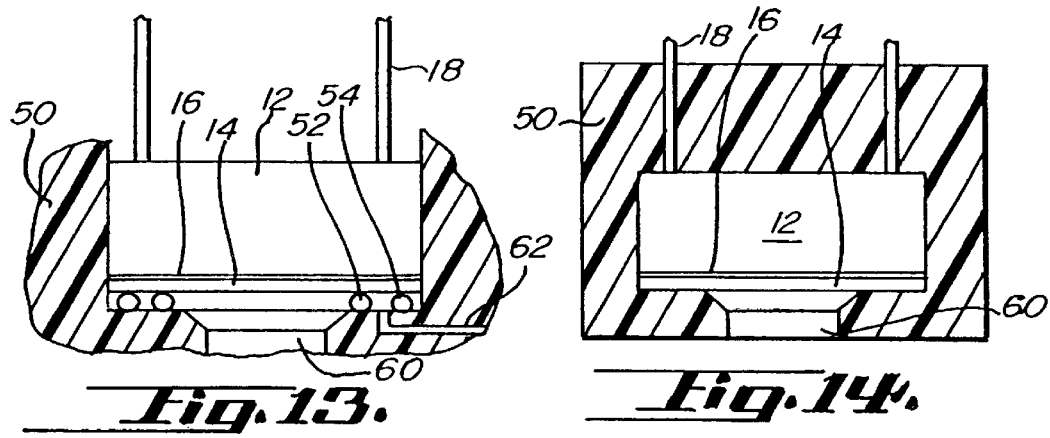
Fig. 13.
Fig. 14.
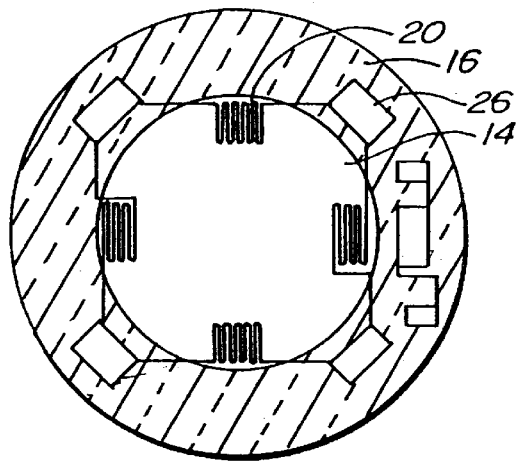
Fig. 15.
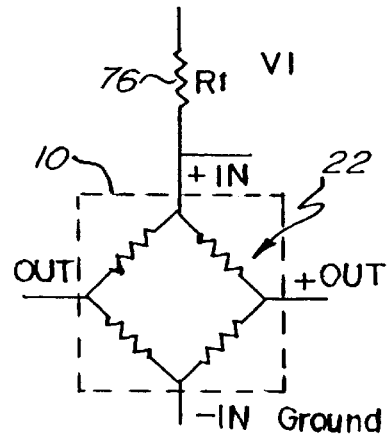
Fig. 16.
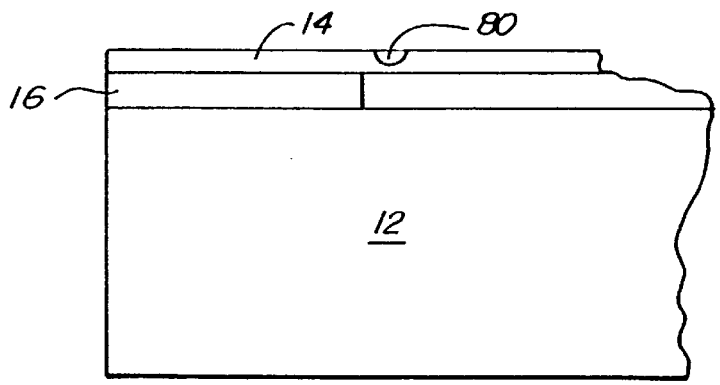
Fig. 17.

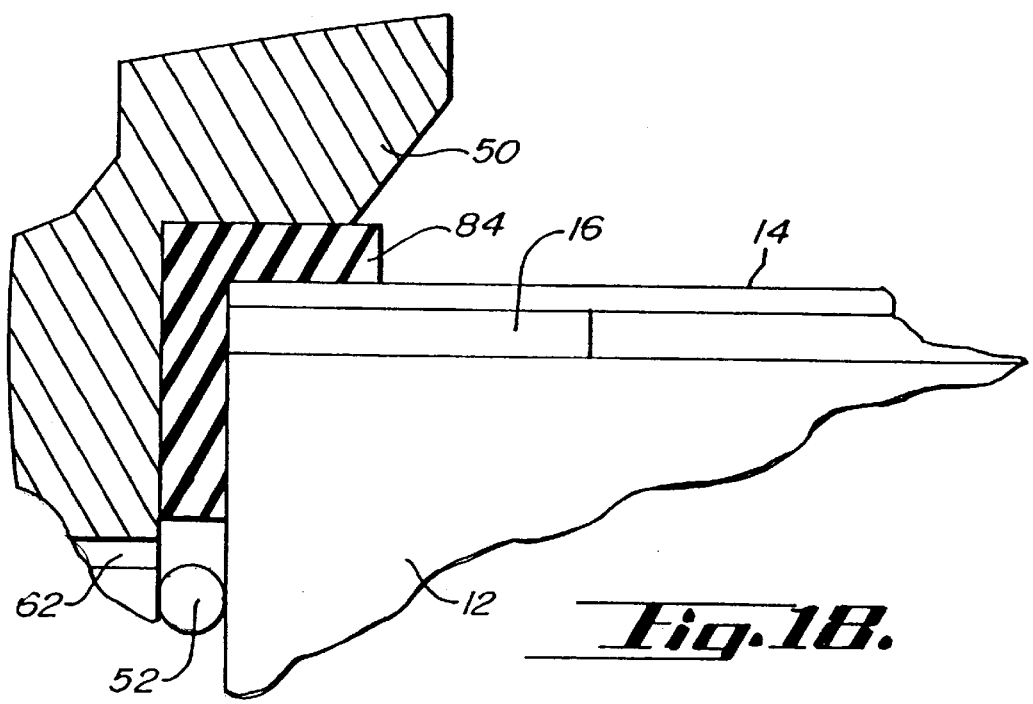

SENSOR USABLE IN ULTRA PURE AND HIGHLY CORROSIVE ENVIRONMENTS

FIELD OF THE INVENTION

This invention relates generally to sensors and more particularly relates to a pressure and/or temperature sensor having exceptional stability up to 200° C. and effectively operable up to 700° C. The pressure sensor of the present invention operates without fluid fill and has no exterior exposed metallic components. The pressure sensor includes a non-porous, impermeable surface that may be positioned in direct contact with fluids in an ultra-pure environment. In one embodiment of the present invention, the non-porous surface is comprised of a layer of single crystal sapphire that is impervious to chemical attack. In this manner, chemicals or contaminants cannot be extracted over time from the sensor into a process stream. Without limitation, the pressure sensor of the present invention is suitable for use in a chemically inert pressure transducer module or flow meter for sensing pressures in process fluids and may be molded directly into the high temperature plastic housing of the same.

BACKGROUND OF THE INVENTION

Pressure sensors have been utilized in various applications to measure either gauge pressure or absolute pressure. Many of these applications involve the measurement of pressure in unfavorable environments. The pressure sensor may be of a capacitive type or piezoresistive type. For example, an alumina ceramic capacitive sensor may comprise a thin, generally compliant ceramic sheet having an insulating spacer ring sandwiched between a thicker, non-compliant ceramic sheet. The first thin ceramic sheet or diaphragm is approximately 0.005 to 0.050 inches in thickness with a typical thickness of 0.020 inches. The thicker ceramic sheet has a thickness range between 0.100 to 0.200 inches. Those skilled in the art will appreciate that the thickness of the diaphragm is preferably dependent upon the diameter of the diaphragm. The spacer may be constructed of a suitable polymer. The apposed faces of ceramic disks are metalized by metals such as gold, nickel or chrome to create plates of a capacitor. A similar capacitive pressure transducer is described by Bell et al. in U.S. Pat. No. 4,177,496 (the '496 patent). Other capacitive pressure transducers similar to that described in the '496 patent are available and known in the art. A piezoresistive sensor typically utilizes a Wheatstone bridge, measuring changes in voltage and correlating the voltage changes to changes in sensed pressure. Either of these pressure sensor types may be utilized to measure the pressure of fluids in ultra-pure environments, however, there is a need for a non-contaminating pressure sensor.

Ultra pure processing of sensitive materials typically requires the use of caustic fluids. The susceptibility to contamination of the sensitive materials during the manufacturing process is a significant problem faced by manufacturers. Various manufacturing systems have been designed to reduce the contamination of the sensitive materials by foreign particles, ionic contaminants, and vapors generated during the manufacturing process. The processing of the sensitive materials often involves direct contact with caustic fluids. Hence, it is critical to deliver the caustic fluids to the processing site in an uncontaminated state and without foreign particulate. Various components of the processing equipment are commonly designed to reduce the amount of particulate generated and ions dissolved into the process fluids, and to isolate the processing chemicals from contaminating influences.

The processing equipment typically includes liquid transporting systems that carry the caustic chemicals from supply tanks through pumping and regulating stations and through the processing equipment itself. The liquid chemical transport systems, which includes pipes, pumps, tubing, monitoring devices, sensing devices, valves, fittings and related devices, are frequently made of plastics resistant to the deteriorating effects of the caustic chemicals. Metals, which are conventionally used in such monitoring devices, cannot reliably stand up to the corrosive environment for long periods of time. Hence, the monitoring and sensing devices must incorporate substitute materials or remain isolated from the caustic fluids.

While the processes must be very clean they often involve chemicals that are very aggressive. These could include for example harsh acids, bases, and solvents. The semiconductor industry has recently introduced processes which make use of aggressive abrasives. Both the process equipment and the monitoring instrumentation must be impervious to the mechanical action of these abrasives.

Further, high reliability of process equipment instrumentation is a must. Shutting down a semiconductor or pharmaceutical line for any reason is costly. In the past, pressure transducers have commonly employed fill fluids to transmit pressure from the process to the sensor itself. The fill fluids are separated from the process by an isolator diaphragm of one sort or another. Failure of this isolator diaphragm and subsequent loss of fill fluid into the process can cause loss of product and require system cleaning before restarting operations. Eliminating the isolator diaphragm and fill fluid from the design is advantageous.

Also, the processing equipment commonly used in semiconductor manufacturing has one or more monitoring, valving, and sensing devices. These devices are typically connected in a closed loop feedback relationship and are used in monitoring and controlling the equipment. These monitoring and sensing devices must also be designed to eliminate any contamination that might be introduced. The sensing devices may include pressure transducer modules and flow meters having pressure sensors. It may be desirable to have a portion of the pressure sensor of the pressure transducer or flow meter in direct contact with the caustic fluids. Thus, the surfaces of the pressure sensor in direct contact with the caustic fluids should be non-contaminating. It has been found that porous materials allow the ingress and egress of caustic fluids through such materials. For example, ceramic materials are bound together with various glass like materials which themselves are easily attacked by the more aggressive corrosive materials. Hence, it is preferable that those portions of the pressure sensor in direct contact with caustic fluids be made of non-porous materials.

U.S. Pat. No. 4,774,843 issued to Ghiselin et al. describes a strain gauge having a single crystal sapphire diaphragm adhered to an aluminum oxide base. Ghiselin et al. indicates that the sapphire is adhered by means of a glass bonding material, epoxy or other adherent methods. Ghiselin et al. does not provide a further description of the glass bonding material or how the glass bond adheres to the sapphire and aluminum oxide base. However. Ghiselin describes the glass bond as a low strength material that separates at strain points. Ghiselin describes a change in geometry to reduce the strain point and thereby avoid the deficiencies of the low strength of the glass. U.S. Pat. No. 5,954,900 issued to Hegner et al. describes problems with using a glass to bond to an aluminum oxide ceramic part. Hegner et al. describes the use of alumina as the joining material to alumina ceramic. The devices described by Hegner et al. and Ghiselin et al. are believed to be limited to effective operable temperatures below 400° C. Thus, the reliability of the sensors described by Hegner et al. and Ghiselin et al. decreases as temperatures exceed 400° C. The caustic fluids of the processing equipment may often exceed 400° C. Hence, there is a need for a pressure sensor having a non-porous surface that is bonded to the base with a high strength bond, wherein the bond between the non-porous material and the base is stable at temperatures in excess of 400° C.

It has also been found that Electromagnetic and Radio Frequency Interference (EMI and RFI respectively) degrade the performance of piezoresistive sensors. A conductive shielding layer cannot be positioned directly between a silicon layer (on which the Wheatstone bridge is formed) and the sapphire because of the epitaxial construction of silicon on sapphire. A conductive shielding layer on the outside of the sapphire is not preferred when the outside of the sapphire is positioned in contact with the caustic fluids. Hence, a need exists for a non-contaminating pressure sensor that blocks the EMI and RFI from affecting the sensing element formed on a non-exposed surface of the pressure sensor. The present invention meets these and other needs that will become apparent from a review of the description of the present invention.

SUMMARY OF THE INVENTION

The present invention provides for a pressure sensor that includes a non-porous outer surface. The non-porous surface is characterized by a low diffusivity and low surface adsorption. In the preferred embodiment, the pressure sensor includes a backing plate, a non-porous diaphragm, a sensing element adjacent an inner surface of the diaphragm, and a glass layer of a high strength material that is bonded by glassing to the backing plate and the non-porous diaphragm. The backing plate provides rigidity to the structure. The rigidity of the backing plate resists stresses transmitted from the housing (not shown) to the sensing elements on the sensor diaphragm. Although the backing plate is not in direct contact with the process medium it is required to be mechanically stable and amenable to high temperature processes. The thermal expansion rate of the backing plate should approximate closely that of the sensing diaphragm. While it is possible to compensate for thermal effects, a large mismatch will produce stresses during manufacture that may cause the bond between the two pieces to yield over time. Those skilled in the art will appreciate that the non-porous diaphragm may include a Wheatstone bridge or a conductive layer formed thereon as part of a piezoresistive or capacitive type sensor respectively.

Without limitation, in the preferred embodiment, a silicon layer is formed on an inner surface of the non-porous diaphragm, wherein a strain gage such as a Wheatstone bridge is formed thereon. The backing plate includes apertures extending therethrough, the apertures being adapted for receiving electrical leads coupled to the sensing element. A change in pressure near the non-porous diaphragm is detectable by the sensing element. An increase and decrease of pressure against the diaphragm causes deflection of the diaphragm which in turn changes the resistances of the strain gage. The changes in resistance is correlated with the pressure adjacent the diaphragm.

Without limitation, the non-porous diaphragm is preferably comprised of a chemically inert material such as sapphire. The glass layer between the sapphire and the backing plate is preferably made of high bond strength borosilicate glass or other glass of suitable known construction having a high bond strength and melt temperature above 700° C. and preferably above 1000° C. The amount that the diaphragm flexes is controlled by the thickness and diameter of the glass layer. The glass layer may have a thickness ranging between 0.002 and 0.030 inches with 0.010 inches being preferred and an outside diameter ranging from 0.100 to 2.0 inches with 0.700 inches being preferred. The active sensing area of the diaphragm may range from 0.050 to 2.0 inches with 0.400 inches being preferred. Those skilled in the art will appreciate that the range of thickness and diameter of the diaphragm should not be construed as limiting, but that the thickness and diameter in certain applications may be further reduced or increased as desired. In this manner, when the non-porous diaphragm flexes to the maximum flexure, a portion of the inner surface of the diaphragm engages an inner surface of the backing plate. Those skilled in the art will appreciate that the backing plate and non-porous diaphragm are constructed of materials having similar thermal expansion rates to avoid unnecessary stress through a wide range of temperatures. As described below in greater detail the pressure sensor may be constructed such that the sensing element may detect an absolute pressure or gage pressure.

The pressure sensor may further include a silicon nitride layer and a metalization or conductive layer positioned between the silicon layer and the backing plate (see FIG. 11). In this manner the silicon nitride layer acts as an electrical insulator and the metalization layer blocks EMI/RFI from affecting the sensing element 20. The pressure sensor may further include a coating, gasket or seal adjacent to at least a portion of an outer edge of the layers of the non-porous diaphragm, silicon nitride layer, metalization layer and the backing plate. Without limitation, acid resistant epoxy or corrosion resistant polymers such as PTFE (polytetrafluroethylene), PVDF (Polyvinylidenefluoride), PEEK (polyetheretherketone), urethane, or parylene may be utilized, wherein an acid resistant epoxy is preferred.

The pressure sensor includes bond pads formed on the diaphragm between the glass layer and the non-porous diaphragm. Without limitation, the preferred embodiment of the bond pads comprise a titanium layer and a diffusion barrier. The doped silicon thin film interconnects the bond pads in a known suitable manner to form the Wheatstone bridge. A window is formed in the glass layer and backing plate, thereby providing access to bond pads. Electrical leads extend through the windows formed in the glass layer and backing plate and the electrical leads are brazed to the bond pads. The electrical leads are brazed to the bond pads and the glass layer is glassed to the diaphragm and backing plate.

In an alternate embodiment the diaphragm and sensing element is modified to create a capacitance rather than a piezoresistive sensor. The thin sensing diaphragm, which flexes when pressure is applied, has a capacitive plate formed on the inner surface of the sensing diaphragm and another capacitive plate is formed on the inner surface of the backing plate. One electrical lead is connected to the capacitive plate formed on the inner surface of the sensing diaphragm and another lead is electrically coupled to the inner surface of the backing plate. As the spacing between the diaphragm and the plate vary with pressure the capacitance of the plates changes. This variation in capacitance is detected by an electrically connected sensing element of known suitable construction.

The advantages of the present invention will become readily apparent to those skilled in the art from a review of the following detailed description of the preferred embodiment especially when considered in conjunction with the claims and accompanying drawings in which like numerals in the several views refer to corresponding parts.

DESCRIPTION OF THE DRAWINGS

FIG. 13 is a partial sectional side elevational view of an embodiment of the pressure sensor of the present invention shown positioned in a pressure transducer housing;

FIG. 14 is a partial sectional side elevational view of an embodiment of the pressure sensor of the present invention shown molded into a pressure transducer housing;

FIG. 15 is a partial sectional top plan view of an embodiment of the diaphragm of the present invention;

FIG. 16 is a partial top plan view of an embodiment of the diaphragm of the present invention;

FIG. 17 is a partial sectional side elevational view of an embodiment of the pressure sensor of the present invention; and FIG. 18 is a partial sectional side elevational view of an embodiment of the pressure sensor of the present invention having a seal or gasket adjacent an edge of the sensor.

DETAILED DESCRIPTION

Figure 1:
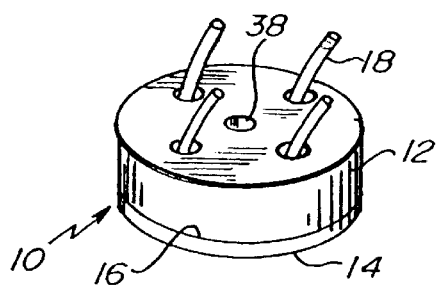
FIG. 1 is a perspective view of the pressure sensor of the present invention.
Figure 2:
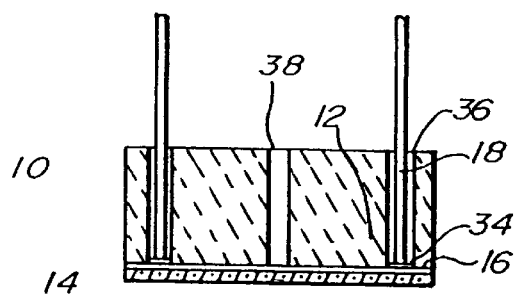
FIG. 2 is a partial sectional side elevational view of an embodiment of the pressure sensor of the present invention.

The present invention represents broadly applicable improvements to pressure sensors. The embodiments detailed herein are intended to be taken as representative or exemplary of those in which the improvements of the invention may be incorporated and are not intended to be limiting. The pressure sensor of the present invention may be constructed as a piezoresistive or capacitance sensor having a sensing diaphragm. The sensing diaphragm is made of a piece of single crystal sapphire. Alternatively, the sensing diaphragm may be constructed of a single crystal diamond. The sensor 10 of the present invention generally comprises a backing plate 12, sensing diaphragm 14, silica glass bond between the backing. plate 14 and diaphragm 16, and electrical leads 18 (see FIGS. 1 and 2). During the manufacture of the sensing diaphragm 14, a large wafer of the single crystal sapphire is used so that many sensors can be fabricated at the same time using the familiar planar processes of the semiconductor technology.

Those skilled in the art will recognize that sapphire is an electrical insulator. When the sapphire is cut along the R-plane it is possible to grow a single crystal epitaxial film of silicon of appropriate thickness on top of the sapphire. The silicon layer can, by diffusion, ion implantation, or other means be doped with atomic species such as boron or phosphorus to give the film semiconducting properties. By varying the implantation energy and dopant concentration the area resistance value of the film can be adjusted. This film, in addition to having electrical resistance, will change its resistance in response to strain. This property is known as piezoresistance. As described earlier, deflection of the sensing diaphragm 14 will strain the film and produce a change in resistance. The pressure-sensing signal is derived from this change in resistance.

Figure 6:
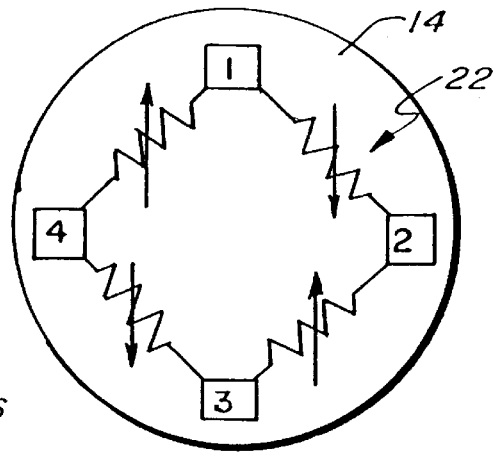
FIG. 6 is a top plan view of the diaphragm having a Wheatstone bridge formed thereon of the present invention.
Figure 7:
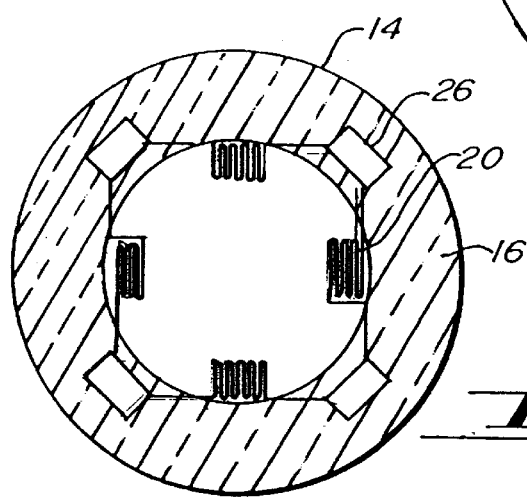
FIG. 7 is a partial sectional top plan view of an embodiment of the diaphragm of the present invention.
Figure 8:
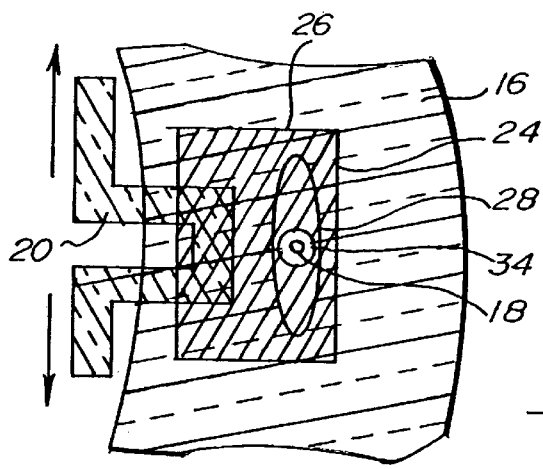
FIG. 8 is a partial sectional top plan view of an embodiment of the bond pads of the present invention.
Figure 9:
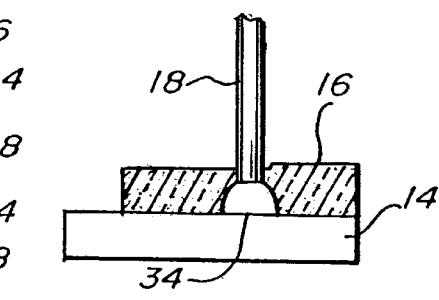
FIG. 9 is a partial sectional side elevational view of an embodiment of the bond pads of the present invention.
Figure 10:
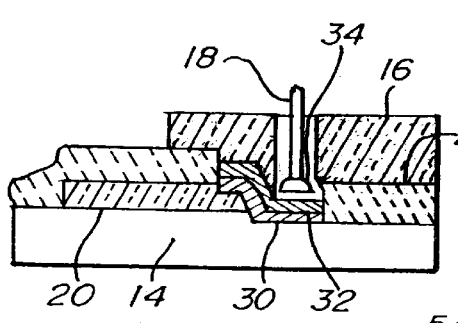
FIG. 10 is a partial sectional side elevational view of an embodiment of the bond pads of the present invention.

If ion implantation is chosen to dope the silicon, an annealing step is desirable following doping to remove stresses that build up in the film during the implantation process. The annealing step also helps distribute the dopant atoms more uniformly throughout the silicon layer. The silicon patterns 20 form a Wheatstone bridge 22 (see FIGS. 6 and 7). Those skilled in the art will appreciate that several different patterns can produce the Wheatstone bridge 22. The silicon resistors 20 may be patterned by standard photolithographic techniques. An insulating layer of silicon nitride 24 (see FIGS. 8 and 10) is applied to the entire surface of the sapphire wafer by chemical vapor deposition. Photolithographic resist is used to prevent the silicon nitride layer 24 from being deposited in the bond pad 26 region. When the resist is etched away a window 28 is opened up above and adjacent to each of the connection points or bond pads 26 to the Wheatstone bridge (see FIG. 8). The silicon nitride layer 24 is a tough insulating layer and further protects the delicate silicon layer.

Metallic bond pads 26 are needed to connect the electrical leads 18 to the Wheatstone bridge 22. Metals commonly used as bond pads 26 in semiconductor devices such as gold and aluminum are unsuitable because they will alloy with the silicon at glassing temperatures. In the preferred embodiment a two metal layer bond pad is constructed (see FIG. 10). Using a process called radio frequency (RF) sputtering a layer of titanium 30 is deposited on the entire wafer. Titanium is a very active metal and has excellent bonding properties. Titanium, however, requires a diffusion barrier 32 between it and the braze material 34. The braze alloy 34 joins the bond pad 26 to pins 18. Without a diffusion barrier 32 the braze 34 will alloy with both the titanium layer 30 and the thin silicon layer 20. Upon cooling, this alloy would be drawn together by surface tension forces and locally destroy the silicon film. The diffusion barrier 32 needs to be a refractory metal that will not form alloys at the brazing temperatures (approximately 1000° C.). Without limitation, niobium, tungsten, iridium, molybdenum, tantalum, platinum, and palladium are suitable for this purpose. The barrier material 32 must be capable of being made into a film having a minimal amount of pinholes extending through the film. Any oxides must dissociate at brazing temperatures. Niobium is found to work well as a diffusion barrier. The niobium is RF sputtered across the entire sapphire wafer 14 on top of the titanium layer 30. The niobium layer is then patterned using known lithographic techniques.

In the preferred embodiment, the metal for the bond pads 26 is deposited and patterned with methods known to those skilled in the art including, without limitation, evaporation and sputtering. The bond pad 26 is patterned in such a way that the metal overlies (see FIG. 8) a portion of the silicon layer 20 but is primarily in direct contact with the sapphire diaphragm 14. The reason for this is that metalization layers may have small pinholes. It has been found that if the braze 34 is able to penetrate the diffusion barrier 32 it will alloy with the silicon with consequent failure of the film. During glassing and brazing, the silica glass 16 can serve to inhibit the flow of the braze 34 from the pin to the region where the bond pad 26 metal overlies the silicon pattern 20. The braze 34 must not overly the silicon pattern 20.

Once the sapphire diaphragm 14 is patterned, the sapphire wafer is diced using known methods of dicing to separate the plurality of sapphire diaphragms from the sapphire wafer. Without limitation, several methods including scribe and fracture along crystal planes, ultrasonic machining, or laser cutting, may be utilized. The use of known methods allows for cutting round diaphragms 14 that are desirable for pressure sensor fabrication.

The electrical leads 18 are brazed to the bond pads 26 and the backing plate 12 is glassed to the diaphragm 14. The thick backing plate 12 or wafer is constructed of ceramic having holes or vias 36 (see FIG. 2). The vias 36 are formed in the backing plate 12 to align with the bond pads 26 and provide passage of electrical leads 18 from the sensor diaphragm 14 to the electronics utilizing the pressure information. A vent hole 38 is provided through the backing plate 12 when a gauge pressure sensing is desired. Generally, ceramics consist of metal oxide powders that are sintered together at high temperature typically using a small amount of glass to act as a binding agent. A common ceramic is alumina which has many similar properties to single crystal sapphire. As long as the glass content of the alumina ceramic is kept below a few percent the thermal expansion properties of the two materials will be negligibly different.

A glass 16 that will bind well to both sapphire and alumina ceramic needs to have similar thermal expansion properties. Borosilicate glasses have been found to be well suited for this purpose. These glasses have far higher melt temperatures than those glasses used for frit bonding materials together. It has been found that sensors fabricated from bulk silicon experience excessive diffusion of dopant atoms into adjacent regions. Thus, these bulk silicon sensors are typically restricted to processing temperatures of no more than 450° C. and then for only brief excursions. As indicated by Ghiselin et al. in U.S. Pat. No. 4,774,843, reliable bonding of sapphire diaphragm to a ceramic backing plate has been a significant problem. The proposed high bond strength borosilicate glasses used in glassing are distinct from lower temperature low strength solder glass or glass frit. The solder glass has a melt temperature around 450° C. and is of lower strength.

Figure 4:
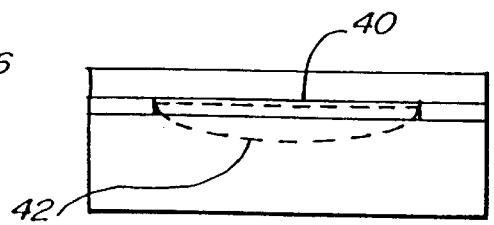
FIG. 4 is a partial sectional side elevational view of an embodiment of the pressure sensor of the present invention.

In order to bond the sapphire to alumina ceramic by "glassing" rather than brazing, a silica glass 16 may be pre-formed or screened onto the surface of the backing plate 12. In either case it is important that the silica glass does not flow far from where it starts. If the inner diameter of the glass pattern changes significantly the pressure characteristics of the sensor 10 can change drastically. Further, during the glassing process, if the glass 16 flows over the metallized bond pad 26 before the braze 34 on the bond pad 26 melts, the pins 18 will not braze to the bond pads 26. The firing of the glass should be at constant temperatures to avoid leaving stresses in the glass bond that could result in instability or glass fracture. Further the silica glass 16 must have openings or windows for the electrical pins 18. Additionally, by controlling the thickness of the silica glass bond 16 between the diaphragm 14 and the backing plate 12, the sensing diaphragm 14 will bottom out on the backing plate 12 during overpressure (see FIG. 4). Thus, this overpressure stop increases the overpressure capacity of the sensor 10 by a factor of 100 or more.

The braze alloy 34 used to bond the electrical lead 18 to the bond pad 26 must melt at a temperature slightly below that of the silica glass 16. Further, the braze 34 must be aggressive enough at its melt temperature to remove any oxides from the metal layers 26. Without limitation, it has been found that several copper braze alloys of suitable known construction are capable of meeting these requirements. When the braze 34 melts before the glass 16 begins to flow, then if the silica glass 16 flows over the bond pad 26 it will flow over the braze 34 and bond pad 26, thereby providing significant stress relief to the bond pad region. Without limitation, a braze alloy such as Pakusil-15 sold by Wesgo Metals, San Carlos, Calif., a Division of Morgan Advanced Ceramics Incorporated has been found to braze acceptably.

The electrical lead or pin 18 should be of a small cross section and preferably be made of a ductile metal. Such a pin 18 confined by the geometry of the holes 36 in the ceramic 12 will have good strain relief properties and will not conduct stress from the pins 18 to the sensing elements. The pins 18 should be plated with a material with good braze and reasonable soldering capabilities such as nickel or gold.

The high temperature capabilities of all of the materials of construction of the sensor 10 allows use of such sensor 10 at very high temperatures (above 400° C.) over extended periods of time and/or such sensor 10 may be molded directly into high performance plastic housings such as TEFLON® ("Teflon" is a registered trademark of E. I. DuPont DeNemours and Company) (see FIG. 14). Such molded in pressure sensor provides an extremely reliable seal between the sensor 10 and plastic housing.

Figure 3:
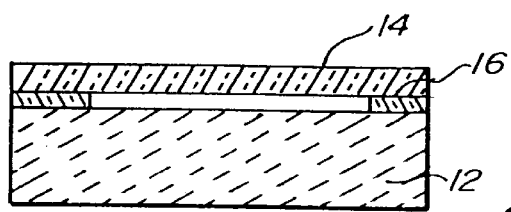
FIG. 3 is a partial sectional side elevational view of an embodiment of the pressure sensor of the present invention.
Figure 5:
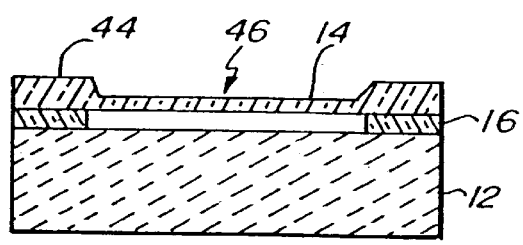
FIG. 5 is a partial sectional side elevational view of an embodiment of the pressure sensor of the present invention.

With reference again to the FIGS. 3 and 4, flexure of the diaphragm 14 will now be discussed. First dotted line identified by 40 represents a greatly exaggerated flexure of the diaphragm 14. Second dotted line identified by 42 represents a flexure of the diaphragm due to overpressure (disregarding the stopping affect the backing plate 12 has on flexure of the diaphragm during overpressure). Such drastic flexure would likely fracture or break the diaphragm 14. FIG. 5 shows a modified diaphragm 14, having a thinner central portions of the diaphragm than the outer portion of the diaphragm. Typically, as the diameter of the diaphragm is decreased, the thickness of the diaphragm should decrease for maximum sensitivity. The gap between the diaphragm 14 and backing plate 12 may be controlled by the thickness of the glass bond 16. Without limitation, a typical flexure of the diaphragm is between 0.01 to 0.0001 inches and the spacing may be between 0.02 to 0.0002 inches depending upon the thickness and diameter of the diaphragm 14. The order of magnitude of the gap is preferably twice the thickness of the diaphragm 14. The active sensing region of the diaphragm may range between 0.075 to 2 inches for a diaphragm having a thickness ranging from 0.002 to 0.050 inches. Practical constraints limit the thickness of a single crystal sapphire wafer during wafer fabrication. Unlike single crystal silicon, however, there is no easy method of forming thin sapphire diaphragms by chemical processes. Although manufacture of the diaphragm from a thinner sapphire wafer works up to a point, the high thermal stresses induced during the sensor forming process result in self-destructing internal stresses. Alternatively, increasing the diameter of the sensing area of the diaphragm increases the sensitivity of a pressure device.

However, typically as the diameter of the diaphragm increases so do the costs.

The modified diaphragm 14 shown in FIG. 5 reduces the thickness of the diaphragm proximate the sensing area while being manufactured from a thicker sapphire wafer. Thinning the diaphragm after thin film processing has been completed allows for more compliant pressure sensing diaphragms. A rim of material left around each device provides strength required, for example, when the sensing diaphragm is in direct contact with a pressure sensor housing. The thin central area 46 provides the sensitivity required. The sapphire diaphragm 14 can be thinned by conventional mechanical means such as abrasive machining or ultrasonic machining known to those skilled in the art. Alternatively, an annular groove 80 may be formed on the outer sensing surface of the diaphragm 14 (see FIG. 17). Those skilled in the art will appreciate that although the shape of the grove is not critical, rounded edges and groove is preferred. Also, although the groove is annular, other geometric shapes may be adequate to relieve flexure stress in the region adjacent the glass bond 16.

Figure 11:
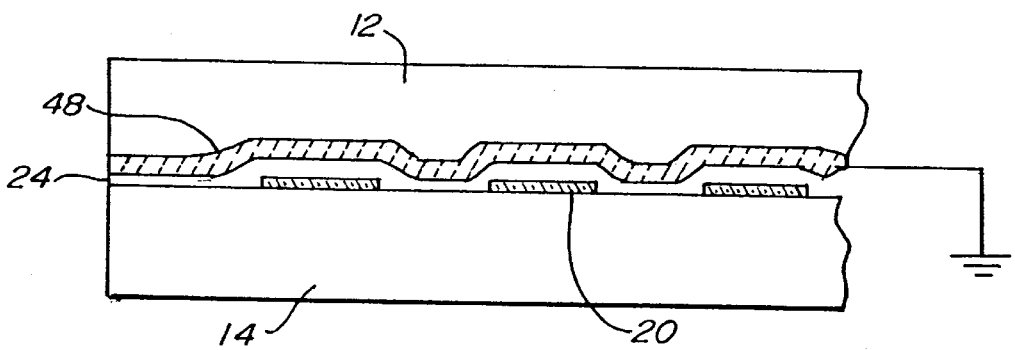
FIG. 11 is a partial sectional side elevational view of an embodiment of the pressure sensor of the present invention.

Referring now to FIG. 11 an alternate embodiment of the pressure sensor of the present invention is shown having a conductive layer sandwiched between the backing plate 12 and the silicon nitride layer 24. The conductive layer 48 is shown electrically grounded. In this manner electromagnetic and radio frequency interference (EMI and RFI) are blocked. EMI and RFI are known to degrade the performance of piezoresistive sensors. Because of the epitaxial construction of silicon on sapphire and the desire to bond the silicon directly to the sapphire, it is not desirable to put a conductive layer between the silicon and the sapphire. Further, putting a conductive layer on the outside of the sapphire diaphragm would defeat the non-porous, chemically inert attributes of the sapphire diaphragm. Without limitation, the conductive or metalization layer 48 may comprise a layer of niobium, tungsten, iridium, molybdenum, tantalum, platinum, and palladium, or other material known to shield EMI and RFI. Thus, the metal layer 48 shields the sensing element from EMI and RFI originating from above the conductive layer.

Since the conductive layer 48 is at ground potential, the EMI and RFI will set up standing waves with zero potential at the conductive layer 48. It is known that if the radiation of the standing waves has frequency components whose wavelength is on the order of the distance between the ground plane and the resistive components, significant interference will result. If, on the other hand, the distance from the ground plane to the resistive components is small, then the standing waves will have negligible amplitude at the location of the piezoresistive element and no interference will occur. Since EMI and RFI interference occurs in the range of 1 MHz to 1,000 MHz, the minimum wavelength for this frequency range is 0.3 meters. Further, the distance between the ground plane and the piezoresistive elements or the silicon pattern 20 is equivalent to the thickness of the silicon nitride layer, which is on the order of 500 Angstrom's or 0.00000005 meters. Thus, the expected effectiveness of EMI and RFI shielding is approximately 6,000,000:1.

Figure 12:
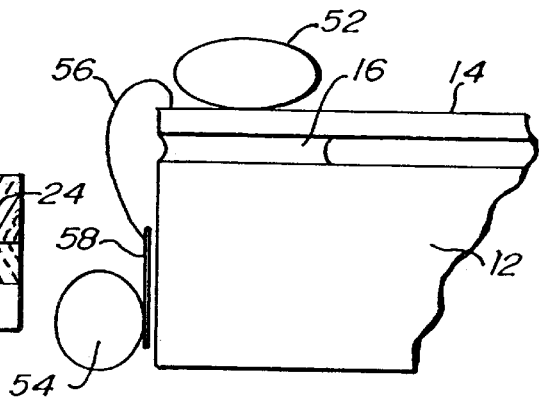
FIG. 12 is a partial sectional side elevational view of an embodiment of the pressure sensor of the present invention.

Referring now to FIG. 12 another alternate embodiment of the sensor 10 of the present invention is shown. A non-porous chemically inert pressure sensor may be used advantageously to detect pressures in a highly caustic environment. Sensors having a sensing diaphragm constructed with single crystal sapphire provide excellent protection against chemical attack. The sensor 10 may be positioned within a pressure transducer housing 50 (see FIG. 13) having primary and secondary seals 52 and 54. If the primary seal engages the outer surface of the sapphire diaphragm, the process fluid wets only the seal and the sapphire. Since seals of known suitable construction are permeable to process fluids, some process fluid will get beyond the primary seal. Very aggressive process fluids such as hydrofluoric acid that permeate past the first primary seal may attack the joint between the sapphire diaphragm 14 and the ceramic backing plate 12. The contaminants from the corrosion of the joint may then permeate back into the process fluids. The present invention may include a chemically resistant polymer such as an acid resistant epoxy, for example without limitation, acid resistant epoxy EP21 AR available from Master Bond, Inc. of Hackensack, N.J. applied to the edge of the sensor 10 surrounding the joint. Alternatively, a gasket type seal made of, for example without limitation, TEFLON, or an elastomeric type seal 84 made of, for example without limitation, KALREZ, may be compressed against the joint of the sensor as shown in FIG. 18. The seal 84 has an L-shaped cross-section and may wrap around the side of the sensor 10 and onto the diaphragm 14 sensing outer surface. Those skilled in the art will appreciate that the gasket seal 84 may be formed as part of the housing 50. Further, to enhance electrical shielding, the material could be made electrically conductive by blending in carbon powder. The conductive epoxy could be connected to an electrical ground by means of conductive ink 58 which is coupled to the ground.

Referring to FIG. 13 the sensor 10 is shown positioned within a pressure transducer housing 50 having fluid port 60. The sapphire diaphragm seals against the primary and secondary seals 52 and 54. A vent or drain 62 may extend from the outside of the pressure transducer housing into the housing between the primary and secondary seal. The vent 62 may relieve pressure between the seals and/or provide a passage for fluids permeating through the primary seal to exit out the pressure transducer housing 50. The sensor 10 of the present invention having a sapphire diaphragm 14 provides a pressure sensor that is corrosion and solvent resistant, has desired flexure with no measurable temperature or pressure hysteresis, and can tolerate process fluid temperatures exceeding 400° C. Referring to FIG. 14, since the pressure sensor is able to withstand high temperatures, the pressure sensor may alternatively be molded into the plastic housing 50 of the pressure transducer as an insert during the plastic injection molding process, thereby eliminating the need for a primary or secondary seal. The housing itself acts as a seal to the sensor 10. Such mold in place pressure sensor and module is expected to reduce production costs, simplify construction and decrease the overall size of the pressure transducer module.

Referring to FIG. 15, another alternate embodiment of the sensor 10 of the present invention is shown. The sensor 10 is capable of detecting both the pressure and temperature of the fluid adjacent the diaphragm 14. The sensor 10 further includes a resistor 70 patterned on the sapphire diaphragm 14. Bond pads 72 are formed on the sensor in a similar manner and at the same time as bond pads 26. The resistor 70 is formed between the glass bond 16 and the diaphragm 14. By positioning the resistor outside the pressure stress zone, pressure induced stresses that may affect the resistance of resistor 70 are thereby avoided. The resistance of the single crystal silicon resistor 70 has well-defined temperature dependence. It has been found that for high doping concentrations (p doping above $10^{19}$ atoms/cc) the function between temperature and resistance closely approximates a linear function. Thus, as resistance changes the temperature change is readily determinable.

FIG. 16 shows another embodiment of the sensor 10, wherein the resistors of the Wheatstone bridge 22 are utilized to both determine pressure and temperature. The outer periphery of sensor 10 is represented by a dotted line. Again, the resistance of the single crystal silicon resistors that comprise the Wheatstone bridge have well-defined temperature dependence. A resistor 76 designated as "Rt" in FIG. 16 is electrically coupled to the Wheatstone bridge 22 but may be isolated from any temperature affects from changes in temperature of the process fluid. For example, without limitation, the resistor 76 may be located with the sensing electronics of a pressure transducer and remote from the diaphragm 14. The value of the resistor 76 is preferably approximately half of the value of the Wheatstone bridge 22 resistance. The effects of pressure on the accuracy of the temperature determination is negligible when the temperature is determined using a polynomial along with data fitting procedures known to those skilled in the art. As the Wheatstone bridge 22 resistance changes with temperature the voltage Vt will also vary. The whole bridge may be utilized as one resistor in a voltage dividing circuit. The voltage Vt can then be used as a temperature signal for an analog or digital correction scheme.

The voltage Vt will depend almost entirely upon the temperature of the Wheatstone bridge 22, especially if the silicon resistors are heavily doped. If the silicon resistors are lightly doped or if the user desires to reduce the uncertainty in the measurement of temperature, the temperature can be derived by a matrix characterization. The following polynomial may be utilized, wherein temperature T is expressed both as a function of outputs Vt and Vp:

$$T = a_{00} a_{01} V_T + a_{02} V_T^2 + \ldots + a_{10} V_P + a_{11} V_P V_T 30\ a_{12} V_P V_{T2} + \ldots + a_{20} V_P^2 + \ldots$$

wherein the coefficients $a_{xx}$ are obtained by a least squares fitting procedure known to those skilled in the art. Utilization of the above characterization along with the data fitting procedure will provide a sensor with a calibrated temperature output that is calibrated for strain effects. Thus, the simultaneous measurement of pressure and temperature from a single sensor is achieved with quick response times. Alternatively, if only temperature output is desired, pressure characterization can be avoided by orienting the legs of the resistor in the axis that is not strain sensitive. For example, maximum strain sensitivity of R-plane silicon on sapphire is attained by orienting the resistor elements 45 degrees to the projected C-axis, where the R-plane and C-axis are defined by Miller indices of crystal geometry. Piezoresistance is zero for resistor elements aligned parallel or perpendicular to the projected C-axis. The axis of the resistors can be rotated to eliminate pressure sensitivity. In this manner, sensor 10 could be made to eliminate pressure sensitivity and to, thus, only determine temperature proximate the sensor 10. This invention has been described herein in considerable detail in order to comply with the patent statutes and to provide those skilled in the art with the information needed to apply the novel principles and to construct and use such specialized components as are required. However, it is to be understood that the invention can be carried out by specifically different equipment and devices, and that various modifications, both as to the equipment and operating procedures, can be accomplished without departing from the scope of the invention itself.

What is claimed is:

1. A sensor having a non-porous outer surface, said sensor comprising:
    a backing plate having an inner and outer surface;
    a non-porous diaphragm having an inner and outer surface, wherein the diaphragm is comprised of a material adapted to be chemically inert and non-contaminating when exposed to an ultra pure chemical process;
    a sensing element disposed over the inner surface of the diaphragm; and
    glass layer that is bonded by glassing to the inner surface of the backing plate and the inner surface of said non-porous diaphragm proximate an outside periphery thereof, thereby bonding said backing plate and said non-porous diaphragm and enclosing said sensing element within said backing plate, wherein at least one of pressure and temperature near said non-porous diaphragm is detectable by said sensing element, wherein said glass layer has both a high bond strength and a high melt temperature that is at or above 700° C.

2. The sensor as recited in claim 1, said glass layer having a thickness dimension, wherein when the non-porous diaphragm flexes to a desired maximum flexure, a portion of the inner surface of the diaphragm engages an inner surface of the backing plate.

3. The sensor as recited in claim 2, wherein the backing plate and non-porous diaphragm are constructed of materials having similar thermal expansion rates.

4. The sensor as recited in claim 1, wherein the backing plate and non-porous diaphragm are constructed of materials having similar thermal expansion rates.

5. The sensor as recited in claim 1, wherein the backing plate and non-porous diaphragm are constructed of materials having similar thermal expansion rates.

6. The sensor as recited in claim 1, wherein said backing plate includes apertures extending therethrough, said apertures being adapted for receiving electrical leads coupled to said sensing element.

7. The sensor as recited in claim 6, further including a silicon layer positioned between the non-porous diaphragm and the backing plate, wherein said sensing element is formed thereon.

8. The sensor as recited in claim 7, further including bond pads between said glass layer and said non-porous diaphragm.

9. The sensor as recited in claim 8, further including windows formed in said glass layer providing access to said bond pads.

10. The sensor as recited in claim 9, therein said electrical leads are brazed to said bond pads.

11. The sensor as recited in claim 9, wherein the silicon layer does not extend into the window formed in said glass layer.

12. The sensor as recited in claim 1, wherein said sensing element detects an absolute pressure.

13. The sensor as recited in claim 1, wherein said sensing element detects an absolute pressure.

14. The sensor as recited in claim 1, further including an aperture extending through said backing plate to allow detection of gauge pressure.

15. The sensor as recited in claim 1, further including an aperture extending through said backing plate to allow detection of gauge pressure.

16. The sensor as recited in claim 1, further including an epitaxially deposited silicon layer on a sapphire diaphragm between the backing plate and the diaphragm, wherein said sensing element is formed thereon.

17. The sensor as recited in claim 16, wherein said sensing element includes a piezoresistive sensing element.

18. The sensor as recited in claim 16, further including a chemically resistant layer positioned between the silicon layer and the backing plate, wherein said chemically resistant layer acts as an electrical insulator.

19. The sensor as recited in claim 16, further including bond pads between said glass layer and said non-porous diaphragm.

20. The sensor as recited in claim 19, further including windows formed in said glass layer providing access to said bond pads.

21. The sensor as recited in claim 19, wherein said bond pads comprise a titanium layer and a diffusion barrier.

22. The sensor as recited in claim 1, wherein said sensing element includes a piezoresistive sensing element.

23. The sensor as recited in claim 1, further including a metalization layer between the non-porous diaphragm and the backing plate to block EMI/RFI from affecting the sensing element.

24. The sensor as recited in claim 1, further including a chemically resistant polymer adjacent to at least a portion of an outer edge of said non-porous diaphragm and said backing plate.

25. The sensor as recited in claim 1, wherein the non-porous diaphragm is comprised of a material selected from the group consisting of sapphire and diamond.

26. The sensor as recited in claim 1, wherein said sensing element includes a capacitive sensing element.

27. The sensor as recited in claim 1, further comprising:
   electrical leads coupled to the sensing element that extend through the backing plate;
   bond pads disposed between said glass layer and said non-porous diaphragm; and
   windows formed in said glass layer providing access to said bond pads, wherein said electrical leads are brazed to said bond pads.

28. The sensor as recited in claim 1, further comprising a primary seal member disposed on a periphery of the surface of the diaphragm.

29. The sensor as recited in claim 28, wherein the primary seal member is L-shaped so as to extend along from the periphery of the diaphragm surface to the side of the sensor.

30. The sensor as recited in claim 28, further comprising a secondary seal member disposed along the side of the backing plate and spaced from the primary seal member.

31. The sensor as recited in claim 1, wherein the surface of the non-porous diaphragm is coated with a material selected from the group consisting of epoxy, PTFE, PVDF, Paralyne, PEEK, and urethane, wherein the coating is applied to at least a portion of an outer edge of said non-porous diaphragm and said backing plate.

32. A sensor having a non-porous outer surface, said sensor comprising:
   a backing plate having an inner and outer surface;
   a non-porous diaphragm having an inner and outer surface;
   means for sensing at least one of temperature and pressure, said sensing means disposed over the inner surface of the diaphragm; and
   a glass layer, selected from a glass material having a melt temperature above 700° C., that is bonded by glassing to the inner surface of the backing plate and the inner surface of said non-porous diaphragm proximate an outside periphery thereof, thereby bonding said backing plate and said non-porous diaphragm, said glass layer having thickness dimension, wherein when the non-porous diaphragm flexes to a desired maximum flexure, a ported of the inner surface of the diaphragm engages an inner surface of the backing plate, wherein at least one of temperature and pressure near said non-porous diaphragm is detectable by said sensing means.

33. The sensor as recited in claim 32, wherein said glass layer includes a borosilicate glass material.

34. The sensor as recited in claim 33, further including an aperture extending through said backing plate to allow detection of gauge pressure.

35. The sensor as recited in claim 33, wherein said sensing means detects an absolute pressure.

36. The sensor as recited in claim 32, wherein the backing plate and non-porous diaphragm are constructed of materials having similar thermal expansion rates.

37. The sensor as recited in claim 32, wherein the backing plate and non-porous diaphragm are constructed of materials having similar thermal expansion rates.

38. The sensor as recited in claim 32, wherein said backing plate includes apertures extending therethrough, said apertures being adapted for receiving electrical leads coupled to said sensing means.

39. The sensor as recited in claim 38, further including a silicon layer positioned between the non-porous diaphragm and the backing plate, wherein said sensing means is formed thereon.

40. The sensor as recited in claim 39, further including bond pads between said glass layer and said non-porous diaphragm.

41. The sensor as recited in claim 40, further including windows formed in said glass layer providing access to said bond pads.

42. The sensor as recited in claim 41, wherein said electrical leads are brazed to said bond pads.

43. The sensor as recited in claim 41, wherein the silicon layer does not extend into the window formed in said glass layer.

44. The sensor as recited in claim 32, wherein said sensing means detects an absolute pressure.

45. The sensor as recited in claim 32, further including an aperture extending through said backing plate to allow detection of gauge pressure.

46. The sensor as recited in claim 32, further including a silicon layer positioned between the non-porous diaphragm and the backing plate, wherein said sensing means is formed thereon.

47. The sensor as recited in claim 46, wherein said sensing means includes a piezoresistive sensing element.

48. The sensor as recited in claim 46, further including a silicon nitride layer positioned between the silicon layer and the backing plate, said silicon nitride layer acts as an electrical insulator.

49. The sensor as recited in claim 46, further including bond pads between said glass layer and said non-porous diaphragm.

50. The sensor as recited in claim 49, further including windows formed in said glass layer providing access to said bond pads.

51. The sensor as recited in claim 49, wherein said bond pads comprise a titanium layer and a diffusion barrier.

52. The sensor as recited in claim 32, wherein said sensing means includes a piezoresistive sensing element.

53. The sensor as recited in claim 32, further including a metalization layer between the non-porous diaphragm and the backing plate to block EMI/RFI from affecting the sensing means.

54. The sensor as recited in claim 32, further including a coating selected from the group consisting of epoxy, PTFE, PVDF, Paralyne, PEEK, and urethane, wherein the coating is applied to at least a portion of an outer edge of said non-porous diaphragm and said backing plate.

55. The sensor as recited in claim 54, wherein the coating is applied to the entire surface of the diaphragm.

56. The sensor as recited in claim 32, wherein the non-porous diaphragm is comprised of a material selected from the group consisting of sapphire and diamond.

57. The sensor as recited in claim 32, said sensing means includes a capacitive sensing element.

58. A pressure sensor having a non-porous outer surface, said pressure sensor comprising:
   a backing plate having an inner and outer surface and including apertures extending therethrough, said apertures being adapted for receiving electrical leads therethrough;
   a non-porous diaphragm having an inner and outer surface;
   a sensing element disposed over the inner surface of the diaphragm, said electrical leads coupled to said sensing element;
   a metallization layer between the non-porous diaphragm and the backing plate, wherein said metallization layer blocks EMI(RFI from affecting the sensing element; and
   a glass layer disposed between the inner surface of the backing plate and the inner surface of said non-porous diaphragm proximate an outside periphery thereof, thereby joining said backing plate and said non-porous diaphragm, wherein a pressure near said non-porous diaphragm is detectable by said sensing element.

59. The pressure sensor as recited in claim 58, wherein the non-porous diaphragm is comprised of a chemically inert material.

60. The pressure sensor as recited in claim 59, wherein said glass layer includes a borosilicate glass material.

61. The pressure sensor as recited in claim 59, wherein the backing plate and non-porous diaphragm are constructed of materials having similar thermal expansion rates.

62. The pressure sensor as recited in claim 59, wherein said sensing element detects an absolute pressure.

63. The pressure sensor as recited in claim 59, further including an aperture extending through said backing plate to allow detection of gauge pressure.

64. The pressure sensor as recited in claim 58, said glass layer having a thickness dimension, wherein when the non-porous diaphragm flexes to a desired maximum flexure, a portion of the inner surface of the diaphragm engages an inner surface of the backing plate.

65. The pressure sensor as recited in claim 64, wherein the backing plate and non-porous diaphragm are constructed of materials having similar thermal expansion rates.

66. The pressure sensor as recited in claim 58, wherein the backing plate and non-porous diaphragm are constructed of materials having similar thermal expansion rates.

67. The pressure sensor as recited in claim 58, wherein said sensing element detects an absolute pressure.

68. The pressure sensor as recited in claim 58, further including an aperture extending through said backing plate to allow detection of gauge pressure.

69. The pressure sensor as recited in claim 58, further including a silicon layer positioned between the non-porous diaphragm and the backing plate, wherein said sensing element is formed thereon.

70. The pressure sensor as recited in claim 69, wherein said sensing element includes a piezoresistive sensing element.

71. The pressure sensor as recited in claim 69, wherein said metalization layer is comprised of a metal selected from the group consisting of niobium, tungsten, iridium, molybdenum, tantalum, platinum, and palladium.

72. The pressure sensor as recited in claim 69, further including bond pads between said glass layer and said non-porous diaphragm.

73. The pressure sensor as recited in claim 72, further including windows formed in said glass layer providing access to said bond pads.

74. The pressure sensor as recited in claim 73, wherein said electrical leads arc brazed to said bond pads.

75. The pressure sensor as recited in claim 73, wherein the silicon layer does not extend into the window formed in said glass layer.

76. The pressure sensor as recited in claim 72, wherein said bond pads comprise a titanium layer and a diffusion barrier.

77. The pressure sensor as recited in claim 58, wherein said sensing element includes a piezoresistive sensing element.

78. The pressure sensor as recited in claim 58 further including an epoxy applied to at least a portion of an outer edge of said non-porous diaphragm and said backing plate.

79. The pressure sensor as recited in claim 58, wherein the non-porous diaphragm is comprised of sapphire.

80. The pressure sensor as recited in claim 58, wherein said sensing element includes a capacitive sensing element.

81. The pressure sensor as recited in claim 58, wherein said glass layer is selected from a glass having a melt temperature above 700° C.

82. The sensor as recited in claim 58, wherein the surface of the non-porous diaphragm is coated with a material selected from the group consisting of epoxy, PTFE, PVDF, Paralyne, PEEK, and urethane, wherein the coating is applied to at least a portion of an outer edge of said non-porous diaphragm and said backing plate.

83. A pressure sensor having a non-porous outer surface, said pressure sensor comprising:
   a backing plate having an inner and outer surface;
   a non-porous diaphragm having an inner and outer surface;
   a sensing element disposed over the inner surface of the diaphragm;
   a silicon layer positioned between said non-porous diaphragm and the backing plate, wherein said sensing element is formed thereon;
   a metalization layer between the silicon layer and the backing plate, wherein said metallization layer blocks affects of EMI/RFI on the sensing element; and
   a glass layer disposed between the inner surface of the backing plate and the inner surface of said non-porous diaphragm, wherein a pressure near said non-porous diaphragm is detectable by said sensing element.

84. The pressure sensor as recited in claim 83, wherein the non-porous diaphragm is comprised of a chemically inert material.

85. The pressure sensor as recited in claim 84, wherein said glass layer includes a borosilicate glass material.

86. The pressure sensor as recited in claim 84, wherein the backing plate and non-porous diaphragm are constructed of materials having similar thermal expansion rates.

87. The pressure sensor as recited in claim 84, wherein said sensing element detects an absolute pressure.

88. The pressure sensor as recited in claim 84, further including an aperture extending through said backing plate to allow detection of gauge pressure.

89. The pressure sensor as recited in claim 83, said glass layer having a thickness dimension, wherein when the non-porous diaphragm flexes to a desired maximum flexure a portion of the inner surface of the diaphragm engages an inner surface of the backing plate.

90. The pressure sensor as recited in claim 87, wherein the backing plate and non-porous diaphragm are constructed of materials having similar thermal expansion rates.

91. The pressure sensor as recited in claim 87, rein the backing plate and non-porous diaphragm are constructed of materials having similar thermal expansion rates.

92. The pressure sensor as recited in claim 83, wherein said backing plate includes apertures extending therethrough, said apertures being adapted for receiving electrical leads coupled to said sensing element.

93. The pressure sensor as recited in claim 83, wherein said sensing element detects an absolute pressure.

94. The pressure sensor as recited in claim 83, further including an aperture extending through said backing plate to allow detection of gauge pressure.

95. The pressure sensor as recited in claim 83, wherein said sensing element includes a piezoresistive sensing element.

96. The pressure sensor as recited in claim 83, wherein said metalization layer is comprised of a metal selected from the group consisting of niobium, tungsten, iridium, molybdenum, tantalum, platinum, and palladium.

97. The pressure sensor as recited in claim 83, further including bond pads between said glass layer and said non-porous diaphragm.

98. The pressure sensor as recited in claim 97, further including windows formed in said glass layer providing access to said bond pads.

99. The pressure sensor as recited in claim 98, further including bond pads between said glass layer and said non-porous diaphragm.

100. The pressure sensor as recited in claim 98, wherein said electrical leads are brazed to said bond pads.

101. The pressure sensor as recited in claim 98, wherein the silicon layer does not extend into the window formed in said glass layer.

102. The pressure sensor as recited in claim 97, wherein said bond pads comprise a titanium layer and a diffusion barrier.

103. The pressure sensor as recited in claim 83, further including an epoxy applied to at least a portion of an outer edge of said non-porous diaphragm and said backing plate.

104. The pressure sensor as recited in claim 83, wherein the non-porous diaphragm is comprised of a material selected from the group consisting of sapphire and diamond.

105. The pressure sensor as recited in claim 83, wherein said sensing element includes a capacitive sensing element.

106. The pressure sensor as recited in claim 83, wherein said glass layer is selected from a glass having a melt temperature above 700° C.

107. A sensor having a non-porous outer surface, said sensor comprising:
a backing plate having an inner and outer surface;
a non-porous diaphragm having an inner and outer surface, wherein the diaphragm is comprised of a material adapted to be chemically inert and non-contaminating when exposed to an ultra pure chemical process;
a conductive layer formed on at least a portion of the inner surface of the diaphragm; and
a glass layer that is bonded by glassing to the inner surface of the backing plate and the inner surface of said non-porous diaphragm proximate an outside periphery thereof, thereby bonding said backing plate and said non-porous diaphragm and enclosing said conductive layer within said backing plate, wherein said glass layer has both a high bond strength and high melt temperature at or above 700° C.

108. The sensor as recited in claim 107, wherein the backing plate and non-porous diaphragm are constructed of materials having similar thermal expansion rates.

109. The sensor as recited in claim 107, wherein said backing plate includes apertures extending therethrough, said apertures being adapted for receiving electrical leads coupled to said conductive layer.

110. The sensor as recited in claim 109, further including bond pads between said glass layer and said non-porous diaphragm.

111. The sensor as recited in claim 110, further including windows formed in said glass layer providing access to said bond pads.

112. The sensor as recited in claim 111, wherein said electrical leads are brazed to said bond pads.

113. The sensor as recited in claim 112, wherein said conductive layer does not extend into said windows.

114. The sensor as recited in claim 110, wherein said bond pads comprise a titanium layer and a diffusion barrier.

115. The sensor as recited in claim 107, further including an aperture extending through said backing plate to allow detection of gauge pressure.

116. The sensor as recited in claim 107, wherein said conductive layer is comprised of silicon.

117. The sensor as recited in claim 107, wherein said sensor includes a piezoresistive sensing element.

118. The sensor as recited in claim 107, wherein said sensor includes a capacitive sensing element.

119. The sensor as recited in claim 107, further including a silicon nitride layer positioned between the conductive layer and the backing plate, said silicon nitride layer acts as an electrical insulator.

120. The sensor as recited in claim 107, further including a metalization layer between the non-porous diaphragm and the backing plate to block EMI/RFI from affecting the sensor.

121. The sensor as recited in claim 107, further including a chemically resistant polymer selected from the group consisting of an epoxy, elastomeric seal, gasket seal, PTFE, PDVF, Paralyne, PEEK, and urethane, wherein the chemically resistant polymer is adjacent to at least a portion of an outer edge of said non-porous diaphragm and said backing plate.

122. The sensor as recited in claim 107, wherein the non-porous diaphragm is comprised of a material selected from the group consisting of sapphire and diamond.

123. The sensor as recited in claim 122, wherein said conductive layer forms a Wheatstone bridge.

124. The sensor as recited in claim 123, wherein sensing elements of the Wheatstone bridge are oriented relative to a projected C-axis of the sapphire diaphragm.

125. The sensor as recited in claim 107, wherein a sensing region of said non-porous diaphragm has a reduced thickness.

126. The sensor as recited in claim 107, wherein said non-porous diaphragm includes an annular groove formed therein.

127. The sensor as recited in claim 107, wherein a thickness dimension of said non-porous diaphragm is dependent upon a diameter of said diaphragm.

128. The sensor as recited in claim 107, wherein a thickness dimension of said non-porous diaphragm is dependent upon a distance between the inner surface of said diaphragm and the inner surface of said backing plate.

129. A method of forming a sensor having a non-porous outer surface, the method comprising:
providing a non-porous diaphragm having an inner and an outer surface, wherein the diaphragm is selected from the group consisting of sapphire and diamond;
forming a sensing element over the inner surface of the non-porous diaphragm;
positioning a backing plate having an inner and an outer surface over at least a portion of the inner surface of the diaphragm and over the sensing element; and
using a glass material layer to bond the inner surface of the backing plate to the inner surface of the diaphragm proximate to an outside periphery of the diaphragm so as to enclose the sensing element, wherein the glass material layer has both a high bond strength and a high melt temperature that is at or above 700° C.

130. The method of claim 129, further comprising the step of bonding the sensing element to an electrical lead via a multiple layer bond pad disposed on the inner surface of the diaphragm.

131. The method of claim 130, further comprising the step of forming an aperture in the backing plate to access the electrical lead.

132. The method of claim 131, further comprising the step of brazing the electrical lead to the bond pad.

133. The method of claim 130, further comprising the step of forming the sensor within a housing and positioning the sensor to expose at least a portion of the outer surface of the diaphragm through a window in the housing.

134. The method of claim 129, further comprising the step of forming a metallization layer between the diaphragm and the backing plate, wherein the metallization layer is adapted to block EMI/RFI from the sensing element.

135. The method of claim 129, further comprising the step of forming a chemically resistant polymer over at least a portion of an outer edge of the diaphragm and a portion of the outer surface of the backing plate.

136. The method of claim 135, further comprising:
forming the polymer with carbon powder to form a conductive polymer; and
depositing a conductive ink layer on the backing plate that is electrically connected to the conductive epoxy.

137. The method of claim 129, wherein the step of providing the diaphragm includes forming the diaphragm with a sensing region having a reduced thickness.

138. The method of claim 129, further comprising the step of forming a bond pad between the glass layer and the diaphragm.

139. The method of claim 138, further comprising the step of forming windows in the glass layer to provide an electrical lead access to the bond pad.

140. The method of claim 139, further comprising the step of forming a silicon layer between the diaphragm and the backing plate and under the sensing element.

141. The method of claim 129, wherein the step of positioning the backing plate includes forming the backing plate as a single member.

142. The method of claim 142, further comprising the step of forming a Wheatstone bridge from the conductive layer.

143. The method of claim 129, wherein the step of providing the diaphragm includes forming the diaphragm with a thickness as a function of a diameter of the diaphragm.

144. The method of claim 129, further comprising the step of forming a groove in the outer surface of the diaphragm adjacent a glass bond and between the diaphragm and the backing plate.

145. The sensor as recited in claim 129, further comprising the step of coating the surface of the diaphragm with a material selected from the group consisting of epoxy, PTFE, PVDF, Paralyne, PEEK, and urethane, wherein the coating is applied to at least a portion of an outer edge of said non-porous diaphragm and said backing plate.

146. A method of forming a sensor having a non-porous outer surface, the method comprising:
providing a non-porous diaphragm having an inner and an outer surface, wherein the diaphragm is selected from the group consisting of sapphire and diamond;
forming a conductive layer on at least a portion of the inner surface of the diaphragm;
positioning a backing plate having an inner and an outer surface over the inner surface of the diaphragm and over the conductive layer; and
using a glass material to bond the inner surface of the backing plate to the inner surface of the diaphragm proximate to an outside periphery of the diaphragm, wherein the glass material layer has both a high bond strength and a high melt temperature that is at or above 700° C.

147. A temperature sensor having a non-porous outer surface, said temperature sensor comprising
a backing plate having an inner and outer surface;
a non-porous, chemically inert diaphragm having an inner and outer surface, the chemically inert diaphragm selected from a group of materials consisting of sapphire and diamond;
a sensing element disposed over the inner surface of the diaphragm; and
a glass layer that is bonded by glassing to the inner surface of the backing plate and the inner surface of said non-porous diaphragm proximate an outside periphery thereof, thereby bonding said backing plate and said non-porous diaphragm and enclosing said sensing element within said backing plate, the sensing element detecting a temperature change of said non-porous diaphragm as a function of the thickness and conductivity of the chemically inert materials of the diaphragm, wherein the glass layer has both a high bond strength and a high melt temperature that is at or above 700° C.

148. A pressure transducer module having therein a sensor with a non-porous outer surface, said the module comprising:
a pressure and temperature sensor that includes:
a backing plate having an inner and outer surface;
a non-porous, chemically inert diaphragm having an inner and outer surface, the chemically inert diaphragm comprised of a material selected from a group consisting of sapphire and diamond;
a sensing element disposed over the inner surface of the diaphragm;
a glass layer that is bonded by glassing to the inner surface of the backing plate and the inner surface of said non-porous diaphragm proximate an outside periphery thereof, thereby bonding said backing plate and said non-porous diaphragm and enclosing said sensing element within said backing plate, wherein at least one of pressure and temperature near said non-porous diaphragm is detectable by said sensing element, and wherein the glass layer has both a high bond strength and a high melt temperature that is at or above 700° C.; and a chemically inert housing adapted to seal the sensor and expose a portion of the diaphragm surface.

149. The transducer as recited in claim 148, wherein the sensor further comprises a primary seal member disposed on a periphery of the surface of the diaphragm and a secondary seal member disposed along the side of the backing plate and spaced from the primary seal member, the primary and secondary seal members adapted to be in contact with the housing and disposed on either side of a vent in the housing, the vent extending from the outside of the housing to between the seal members and adapted to facilitate the passage of fluids and relieve any pressure between the seal members.

150. A sensor having a non-porous outer surface, said sensor comprising:

a backing plate having an inner and outer surface;

a sapphire diaphragm having an inner and outer surface, wherein the outer surface includes a coating, the coating being selected from the group consisting of epoxy, PTFE, PVDF, Paralyne, PEEK, and urethane;

a sensing element disposed over the inner surface of the diaphragm;

a glass layer that is bonded by glassing to the inner surface of the backing plate and the inner surface of said sapphire diaphragm proximate an outside periphery thereof, thereby bonding said backing plate and said diaphragm and enclosing said sensing element within said backing plate, wherein at least one of pressure near said diaphragm is detectable by said sensing element, wherein said glass layer has both a high bond strength and a high melt temperature that is at or above 700° C.

* * * * *